US012757842B1

(12) United States Patent
Horschel et al.

(10) Patent No.: US 12,757,842 B1
(45) Date of Patent: Oct. 13, 2026

(54) RIDE-ON BLOWER UNIT

(71) Applicant: Horschel Brothers Precision LLC, Springville, NY (US)

(72) Inventors: Louis Horschel, Springville, NY (US); Karl G. Horschel, Springville, NY (US)

(73) Assignee: Horschel Brothers Precision LLC, Springville, NY (US)

(*) Notice: Subject to any disclaimer, the term of this patent is extended or adjusted under 35 U.S.C. 154(b) by 349 days.

(21) Appl. No.: 18/377,980

(22) Filed: Oct. 9, 2023

Related U.S. Application Data

(60) Provisional application No. 63/470,669, filed on Jun. 2, 2023, provisional application No. 63/417,105, filed on Oct. 18, 2022, provisional application No. 63/414,328, filed on Oct. 7, 2022.

(51) Int. Cl.

| | |
|---|---|
| ***A01G 20/47*** | (2018.01) |
| ***A01B 69/00*** | (2006.01) |
| *E01H 1/08* | (2006.01) |

(52) U.S. Cl.

CPC ............ *A01G 20/47* (2018.02); *A01B 69/003* (2013.01); *E01H 1/08* (2013.01)

(58) Field of Classification Search

CPC ....... E01H 1/0809; B60R 11/00; A01G 20/47; A47L 9/12; A47L 5/14

See application file for complete search history.

(56) References Cited

U.S. PATENT DOCUMENTS

| | | | | |
|---|---|---|---|---|
| 6,226,833 | B1 * | 5/2001 | Kawaguchi | A47L 9/009 15/330 |
| 7,752,706 | B2 * | 7/2010 | Goodger | A01G 20/47 15/327.6 |
| 10,343,618 | B2 * | 7/2019 | Shumaker | B60R 11/00 |
| 2016/0120131 | A1 * | 5/2016 | Conrad | F04D 25/0673 15/319 |
| 2018/0092498 | A1 * | 4/2018 | Mata | A47L 9/242 |
| 2019/0344724 | A1 * | 11/2019 | Shumaker | A01G 20/47 |
| 2020/0069126 | A1 * | 3/2020 | Mantes | A47L 9/10 |
| 2021/0114673 | A1 * | 4/2021 | Street | F04D 29/545 |

* cited by examiner

*Primary Examiner* — Michael D Jennings

(74) *Attorney, Agent, or Firm* — Phillips Lytle LLP; David L Principe

(57) ABSTRACT

A self-propelled ride-on blower unit used primarily for clearing debris and/or leaves. The blower unit has a pair of drive wheels that are independently driven. The blower unit has a platform for the user to stand on and a pair of control handles for controlling the speed of each drive wheel. A main engine provides power to a drive shaft that is mechanically coupled to an axial turbine blower. An elbow is attached at the outlet of the turbine blower and is configured to rotate relative to the blower. The control handles are operatively associated with a switch for controlling rotation of the elbow. The arrangement of the controls provides for changing the position of the elbow without the user removing their hands from the control handles. The blower unit is also provided with a butterfly valve to shut off the air flow without shutting off the engine or disengaging the turbine blower from the engine.

24 Claims, 9 Drawing Sheets

RIDE-ON BLOWER UNIT

CROSS-REFERENCE TO RELATED APPLICATIONS

The present invention claims priority benefit of U.S. Provisional Patent Application No. 63/414,328, filed on Oct. 7, 2022, and entitled "Ride-on Blower Unit"; U.S. Provisional Patent Application No. 63/417,105, filed Oct. 18, 2022, and entitled "Ride-on Blower Unit"; and U.S. Provisional Patent Application No. 63/470,669, filed Jun. 2, 2023, and entitled "Ride-on Blower Unit"; all of which are incorporated herein by reference.

TECHNICAL FIELD

The present invention relates generally to the field of debris and leaf blowers, and more particularly to a turbine blower unit.

BACKGROUND ART

Debris and leaf blowers are used in connection with many applications such as, but not limited to, general landscaping, blacktop sealing, and golf course maintenance. There have been tow behind turbine blowers for the above applications. What is needed is a self-propelled debris and leaf blower with a platform for supporting a standing operator that also incorporates numerous advanced features.

BRIEF SUMMARY OF THE INVENTION

With parenthetical reference to the corresponding parts, portions or surfaces of the disclosed embodiment, merely for the purposes of illustration and not by way of limitation, the present invention meets the above described need by providing a ride-on blower unit (10) configured to support a user.

The blower unit (10) includes a frame (22). A platform (37) is supported by the frame (22) and is configured to support the user.

A pair of drive wheels (16, 19) may be mounted on the frame (22). One or more casters (25, 28) may be mounted on the frame (22).

A first control handle (40) may be mounted on the blower unit (10) and may be configured such that it is within reach of the user during operation of the blower unit (10). The first control handle (40) may be operatively associated with one of the drive wheels (16, 19).

A second control handle (43) may be mounted on the blower unit (10) and may be configured such that it is within reach of the user during operation of the blower unit (10). The second control handle (43) may be operatively associated with one of the drive wheels (16, 19).

A switch (94) may be mounted such that when the user's hand is in contact with one of the first control handle (40) and the second control handle (43) the switch (94) can be operated by the operator's hand without removing the hand from contact with one of the first and second control handles (40, 43).

An engine (20) may be mounted on the frame (22). A drive shaft (14) may be mechanically coupled to the engine (20).

A turbine blower (13) has an inlet and an outlet. The turbine blower (13) may be configured for axial flow in the direction of the longitudinal axis (arrow 29) of the drive shaft (14). The turbine blower (13) may be mechanically coupled to the drive shaft (14) such that the drive shaft (14) causes a shaft (21) to rotate the blades of the turbine blower (13). The rotating blades causes air flow in the axial direction.

An elbow (31) may be connected to the outlet of the turbine (13). The elbow (31) may be configured to rotate relative to the outlet of the turbine (13).

In another aspect of the invention, the one or more casters (25, 28) are configured to rotate three-hundred and sixty degrees about a vertical axis.

In another aspect of the invention, the pair of drive wheels (16, 19) are driven independently by hydrostatic transmissions.

In yet another aspect of the invention the platform (37) supports the user in a standing position.

Another aspect of the invention includes an electric gear motor (34) powered by the engine (20). The electric gear motor (34) has an output shaft rotating a sheave (50) that is mechanically coupled to a belt (53) configured to rotate the elbow (31).

In another aspect of the invention the electric gear motor (34) is operatively associated with an infinitely variable drive.

In another aspect of the invention a switch (94) actuates the drive for the electric gear motor (34) to rotate the elbow (31).

In yet another aspect of the invention, the engine (20) provides power to the drive wheels (16, 19) and the turbine blower (13).

Another aspect of the invention is that the drive wheels (16, 19) are configured to be driven in the same direction.

Another aspect of the invention is that the drive wheels (16, 19) are configured to be driven in opposite directions.

In another aspect of the invention, the platform (37) is pivotally attached to the frame (22).

In another aspect of the invention a butterfly valve (99) is disposed inside the elbow (31).

In yet another aspect of the invention, the switch (94) is mounted on one of the first and second control handles (40, 43).

DESCRIPTION OF THE PREFERRED EMBODIMENTS

Figure 1:
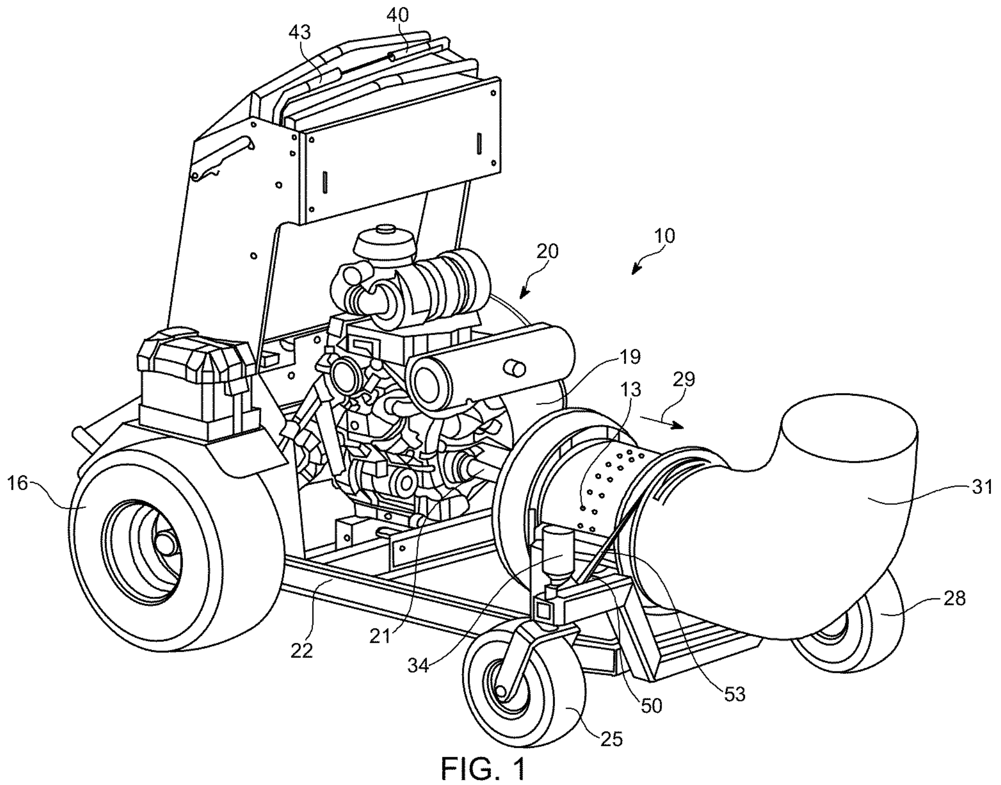
FIG. 1 is a front perspective view of one embodiment of the ride-on blower unit of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms “horizontal”, “vertical”, “left”, “right”, “up” and “down”, as well as adjectival and adverbial derivatives thereof, (e.g., “horizontally”, “rightwardly”, “upwardly”, etc.), simply refer to the orientation of the illustrated structure as the particular drawing figure faces the reader. Similarly, the terms “inwardly” and “outwardly” generally refer to the orientation of a surface relative to its axis of elongation, or of rotation, as appropriate.

Referring now to FIGS. 1-5 of the drawings generally, and initially to FIG. 1 thereof, this invention provides a ride-on blower unit 10. An axial flow turbine style blower 13 and a pair of drive wheels 16, 19 receive power from a driveshaft 14 (FIG. 3) of a main drive engine 20. The driveshaft 14 of drive engine 20 is mechanically coupled to a shaft 21 that turns a set of turbine blades in the axial blower 13 to generate air flow in the direction of the longitudinal axis of the shaft 21 (in the direction of arrow 29). The frame 22 supports the blower 13, the engine 20, the drive wheels 16, 19 and a pair of front wheels 25, 28 that may be configured as casters capable of rotating three-hundred sixty degrees about a vertical axis.

The outlet of the blower 13 is provided with an elbow 31 that provides for an approximately ninety degree turn of the air flow. A nozzle (not shown) may be attached at the end of the elbow 31.

The elbow 31 may be rotated up to three-hundred sixty degrees by means of an electric gear motor 34 that may be provided with an infinitely variable drive. The motor 34 may be coupled to a sheave 50 for driving a belt 53 that turns the elbow 31 which rotates about the outlet of the blower 13. The motor 34 controls may provide for automatic pre-positioning of the elbow 31 when the machine is turned on.

The unit 10 produces the same airflow regardless of the orientation of the elbow 31. In FIG. 1, the elbow 31 is pointed upward whereas in FIG. 5, the elbow 31 is pointed to the side of the unit 10 during operation.

The wheels 16, 19 may be independently driven by a pair of separate hydrostatic transmissions. The power for the wheels 16, 19 is taken off of the drive shaft 14 of the main drive engine 20.

The drive shaft 14 of the engine 20 may be coupled to the drives for wheels 16, 19 by a V-belt.

Accordingly, the drive for engine 20 may provide power for both the blower 13 and the drive wheels 16, 19.

The drive wheels 16 and 19 may be driven in the same direction or in opposite directions. The unit is provided with control handles 40, 43 on each side for controlling power to drive wheels 16, 19.

Figure 2:
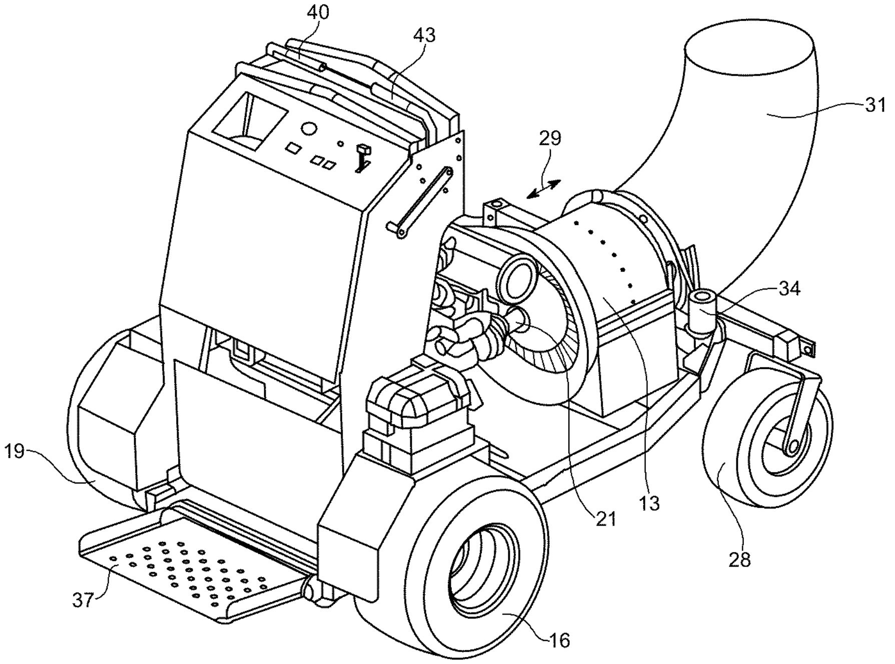
FIG. 2 is a rear perspective view of the ride-on blower unit shown in FIG. 1.
Figure 3:
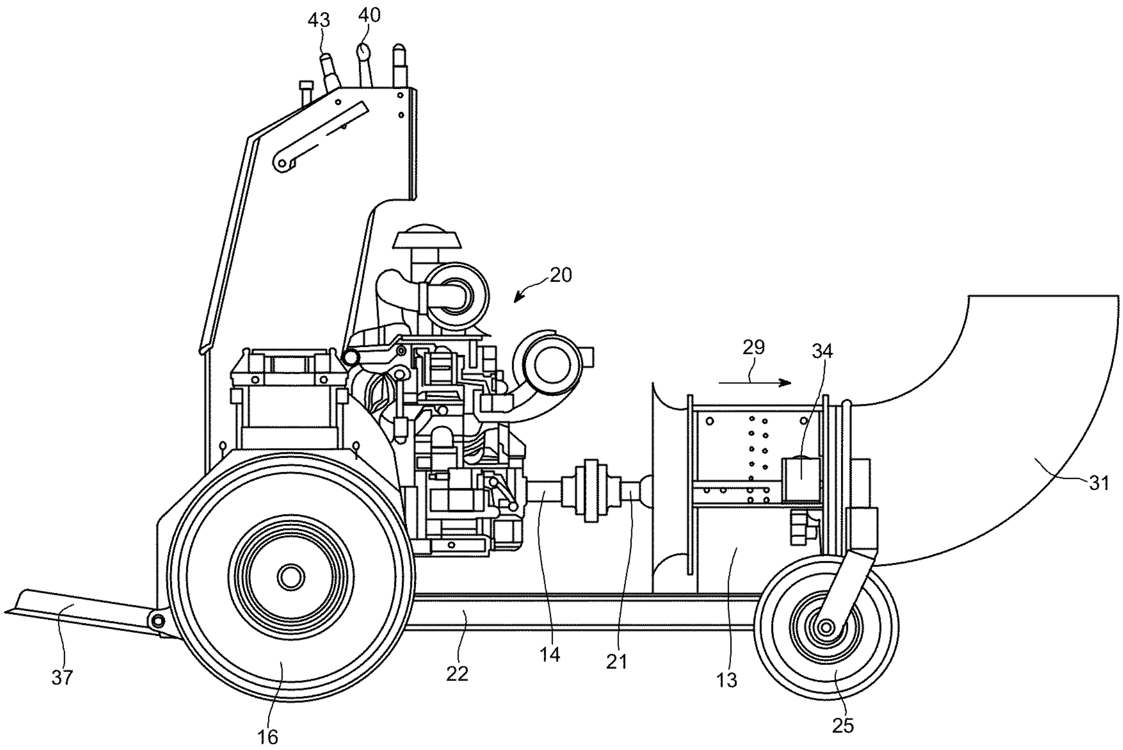
FIG. 3 is a side elevation view of the ride-on blower unit shown in FIG. 1.
Figure 4:
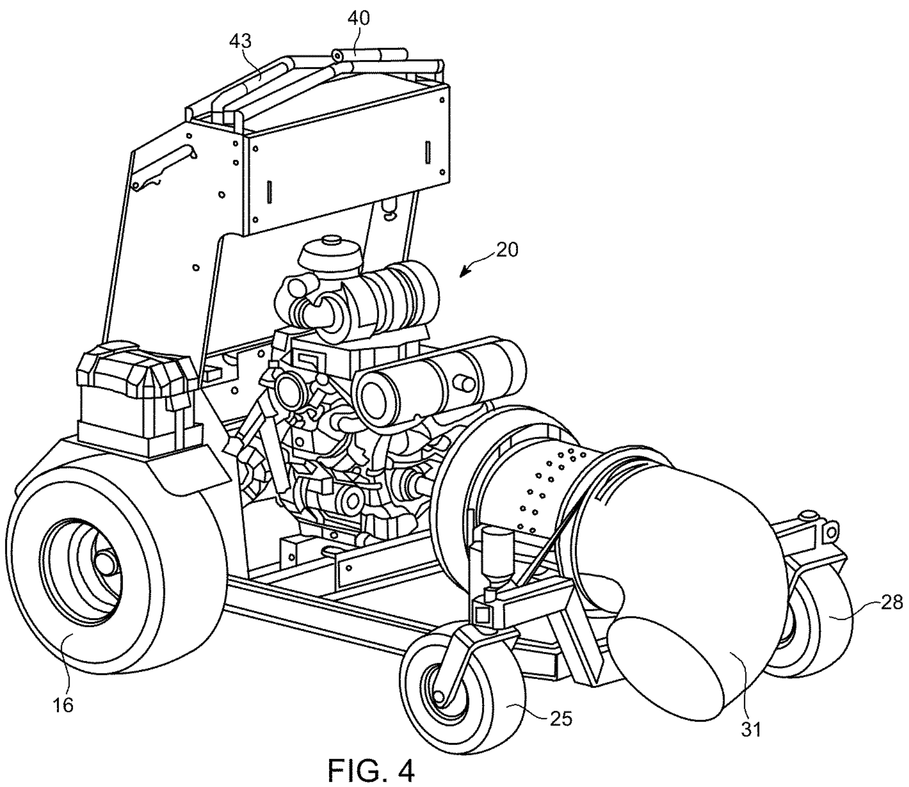
FIG. 4 is front perspective view showing the elbow of the ride on position in a side discharge position.
Figure 5:
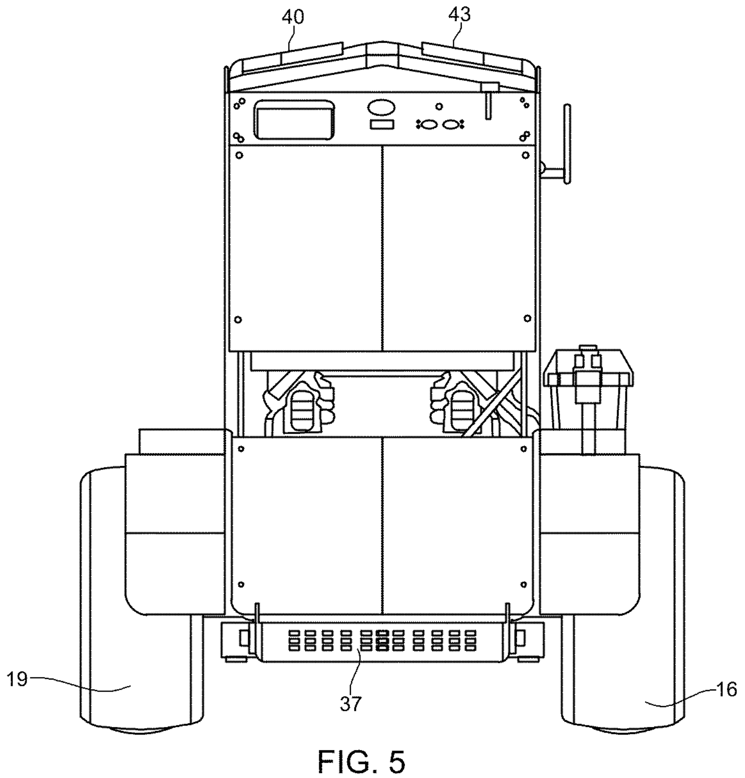
FIG. 5 is a rear elevation view of the ride-on blower unit shown in FIG. 1

As best shown in FIG. 2, a platform 37 may extend from the back of the unit 10 for an operator to stand on. The platform 37 may be pivotally attached so that it can be retracted when not in use.

Figure 6:
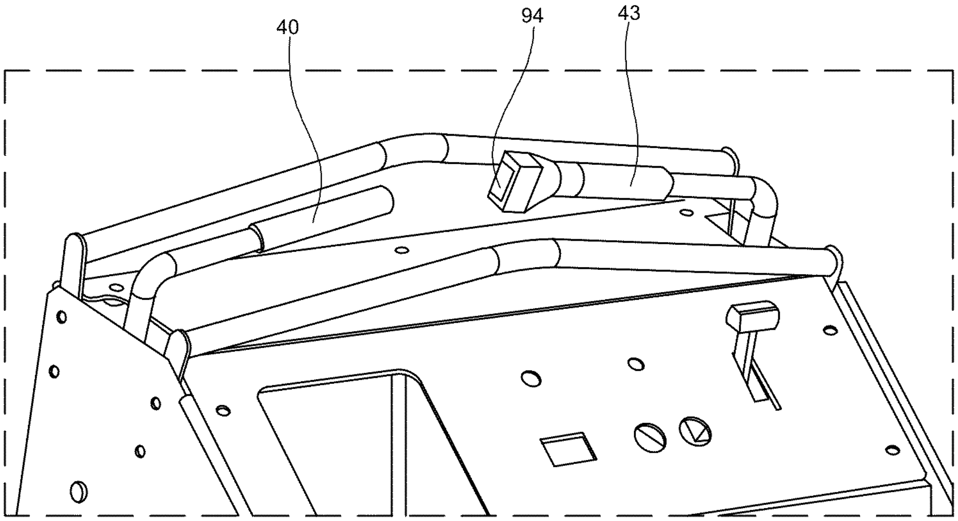
FIG. 6 is a partial perspective view of an alternate embodiment of the ride-on blower unit shown in FIG. 1.
Figure 7:
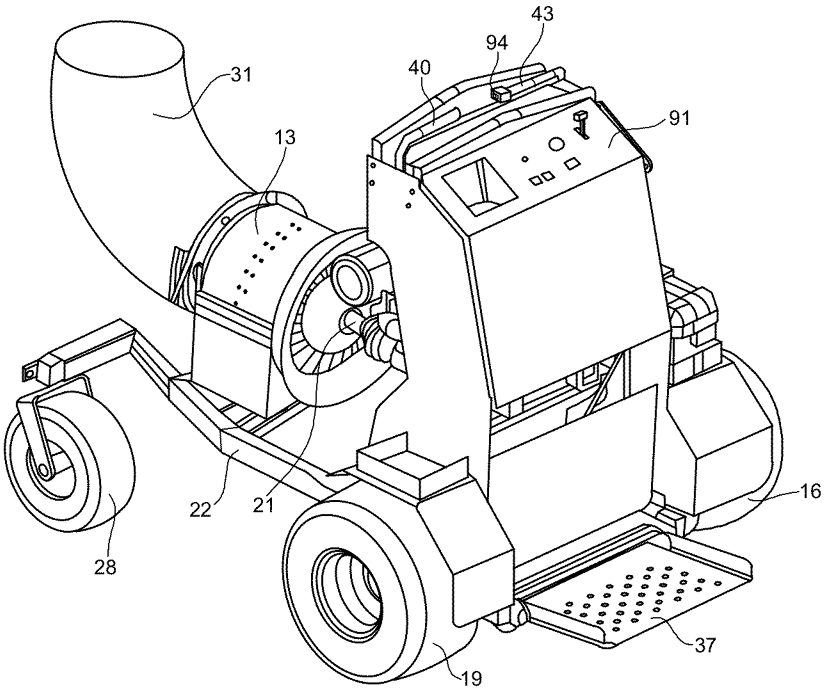
FIG. 7 is a front perspective view of the ride-on blower unit shown in FIG. 6.

Turning to FIGS. 6 and 7, an electric switch 94 may be mounted to the end of the control handle 43. The handle 43 is also used to control the speed of the drive wheel 16 as described above. The electric switch 94 may be operatively associated with the gear motor 34 to provide for infinite adjustment of the position of the elbow 31 via the belt 53. Belt 53 is driven by the gear motor 34. In this manner, the position of the elbow 31 may be infinitely adjusted over three-hundred sixty degrees of rotation without the operator removing their hand from the control handle 43.

Figure 8:
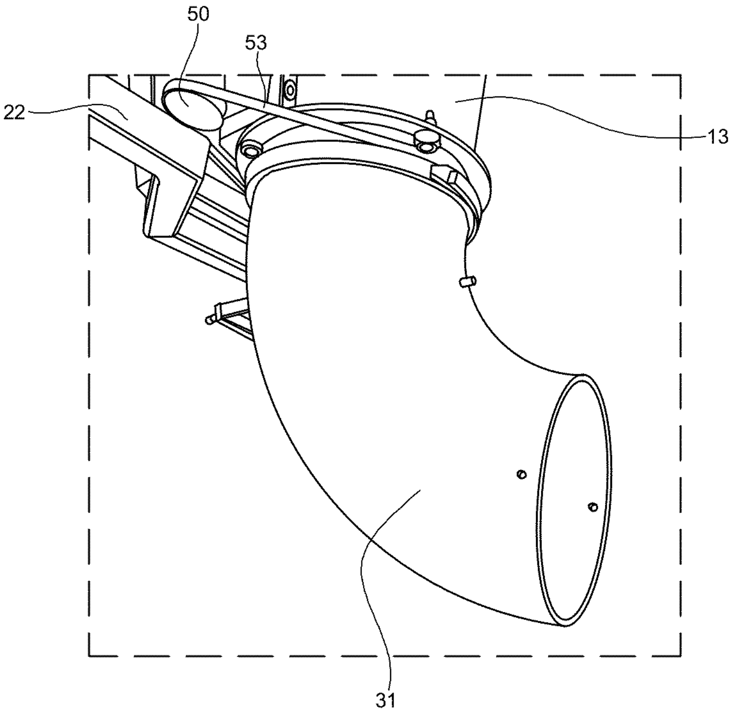
FIG. 8 is an enlarged partial perspective view showing the elbow in the vertical discharge position.
Figure 9:
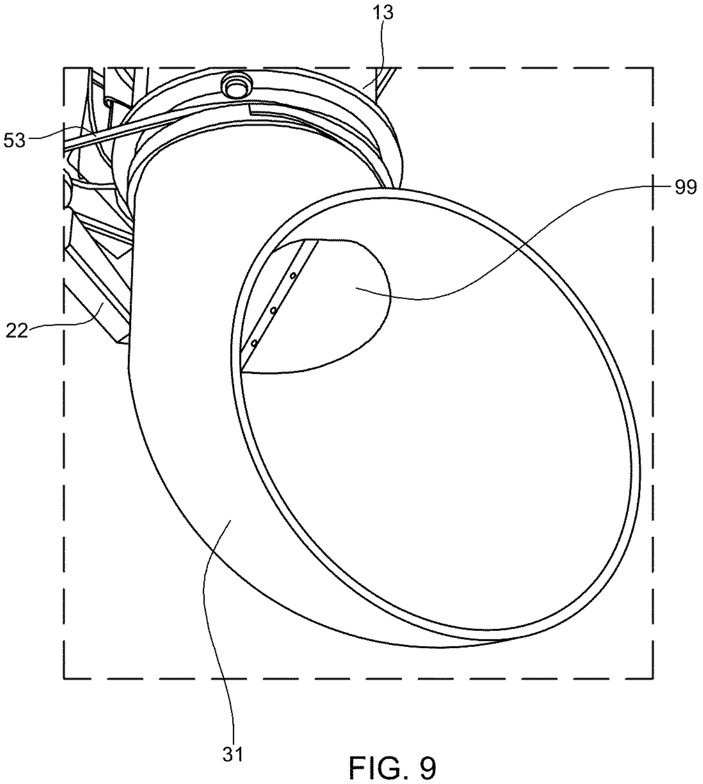
FIG. 9 is a perspective view showing the inside of the elbow.

Turning to FIGS. 8 and 9, the inside of the elbow 31 may be provided with a butterfly type valve 99 that may be remotely controlled from the control panel 91 (FIG. 7) located where the operator stands on the platform 37. The remote control of the butterfly valve 99 may be conducted via mechanical linkage in a cable or through a wired or wireless electric remote control as will be evident to persons of ordinary skill in the art based on this disclosure. The purpose of the valve 99 is to shut off the airflow while the unit 10 is running. For example, when the unit is running and it is being moved into an enclosed trailer or workshop the valve 99 can be closed to prevent the air from blowing against the walls or ceiling.

The present invention contemplates that many changes and modifications may be made. Therefore, while the presently-preferred form of the ride-on blower unit has been shown and described, and several modifications and alternatives discussed, persons skilled in this art will readily appreciate that various additional changes and modifications may be made without departing from the spirit of the invention.

What is claimed is:

1. A blower unit configured to support a user, the blower unit, comprising:
- a frame;
- a platform supported by the frame and configured to support the user;
- a pair of drive wheels mounted on the frame;
- one or more casters mounted on the frame;
- a first control handle mounted on the blower unit and configured such that it is within reach of the user during operation of the blower unit, the first control handle operatively associated with one of the drive wheels;
- a second control handle mounted on the blower unit and configured such that it is within reach of the user during operation of the blower unit, the second control handle operatively associated with one of the drive wheels;
- a switch mounted such that, when the user's hand is in contact with one of the first control handle and the second control handle, the switch can be operated by the user's hand without removing the hand from contact with one of the first and second control handles;
- an engine mounted on the frame;
- a drive shaft mechanically coupled to the engine;
- a turbine having blades and having an inlet and an outlet, the turbine configured for axial flow in the direction of the longitudinal axis of the drive shaft, the turbine mechanically coupled to the drive shaft such that the drive shaft causes the blades of the turbine to rotate;
- an elbow connected to the outlet of the turbine; and,
- wherein the elbow is configured to rotate relative to the outlet of the turbine.

2. The blower unit of claim 1, wherein the one or more casters are configured to rotate three-hundred and sixty degrees about a vertical axis.

3. The blower unit of claim 1, wherein the pair of drive wheels are driven independently by hydrostatic transmissions.

4. The blower unit of claim 1, wherein the platform supports the user in a standing position.

5. The blower unit of claim 1, further comprising an electric gear motor powered by the engine, the electric gear motor having an output shaft rotating a sheave that is mechanically coupled to a belt configured to rotate the elbow.

6. The blower unit of claim 5, wherein the electric gear motor is operatively associated with an infinitely variable drive.

7. The blower unit of claim 6, wherein the switch actuates the drive for the electric gear motor to rotate the elbow.

8. The blower unit of claim 1, wherein the engine provides power to the drive wheels and the turbine.

9. The blower unit of claim 1, wherein the drive wheels are configured to be driven in the same direction.

10. The blower unit of claim 1, wherein the drive wheels are configured to be driven in opposite directions.

11. The blower unit of claim 1, wherein the platform is pivotally attached to the frame.

12. The blower unit of claim 1, further comprising a butterfly valve disposed inside the elbow.

13. The blower unit of claim 1, wherein the switch is mounted on one of the first and second control handles.

14. A blower unit configured to support a user, the blower unit, comprising:

a frame;

a platform supported by the frame and configured to support the user;

a pair of drive wheels mounted on the frame;

one or more casters mounted on the frame;

a first control handle mounted on the blower unit and configured such that it is within reach of the user during operation of the blower unit, the first control handle operatively associated with one of the drive wheels;

a second control handle mounted on the blower unit and configured such that it is within reach of the user during operation of the blower unit, the second control handle operatively associated with one of the drive wheels;

a switch mounted such that, when the user's hand is in contact with one of the first control handle and the second control handle, the switch can be operated by the user's hand without removing the hand from contact with one of the first and second control handles;

an engine mounted on the frame;

a drive shaft mechanically coupled to the engine;

a turbine having blades and having an inlet and an outlet, the turbine configured for axial flow in the direction of the longitudinal axis of the drive shaft, the turbine mechanically coupled to the drive shaft such that the drive shaft causes the blades of the turbine to rotate;

an elbow connected to the outlet of the turbine;

means for rotating the elbow relative to the outlet of the turbine; and, a butterfly valve disposed inside the elbow; and, wherein the switch actuates the means for rotating the elbow.

15. The blower unit of claim 14, wherein the one or more casters are configured to rotate three-hundred and sixty degrees about a vertical axis.

16. The blower unit of claim 14, wherein the pair of drive wheels are driven independently by hydrostatic transmissions.

17. The blower unit of claim 14, wherein the platform supports the user in a standing position.

18. The blower unit of claim 14, wherein the means for rotating the elbow further comprises an electric gear motor powered by the engine, the electric gear motor having an output shaft rotating a sheave that is mechanically coupled to a belt configured to rotate the elbow.

19. The blower unit of claim 18, wherein the electric gear motor is operatively associated with an infinitely variable drive.

20. The blower unit of claim 19, wherein the switch actuates the drive for the electric gear motor to rotate the elbow.

21. The blower unit of claim 14, wherein the engine provides power to the drive wheels and the turbine.

22. The blower unit of claim 14, wherein the drive wheels are configured to be driven in the same direction.

23. The blower unit of claim 14, wherein the drive wheels are configured to be driven in opposite directions.

24. The blower unit of claim 14, wherein the platform is pivotally attached to the frame.

* * * * *